J. C. LARSEN.
BRAKE MECHANISM FOR SIX-WHEEL TRUCKS.
APPLICATION FILED APR. 1, 1918.
1,298,228.
Patented Mar. 25, 1919.
2 SHEETS—SHEET 1.
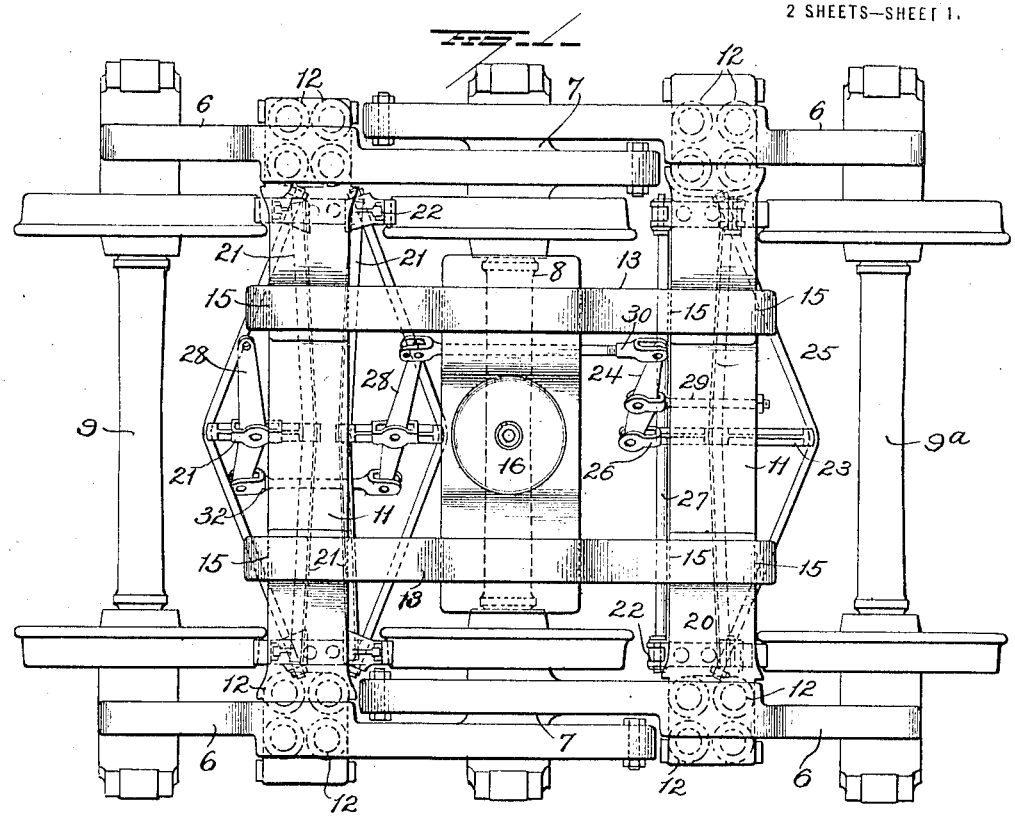
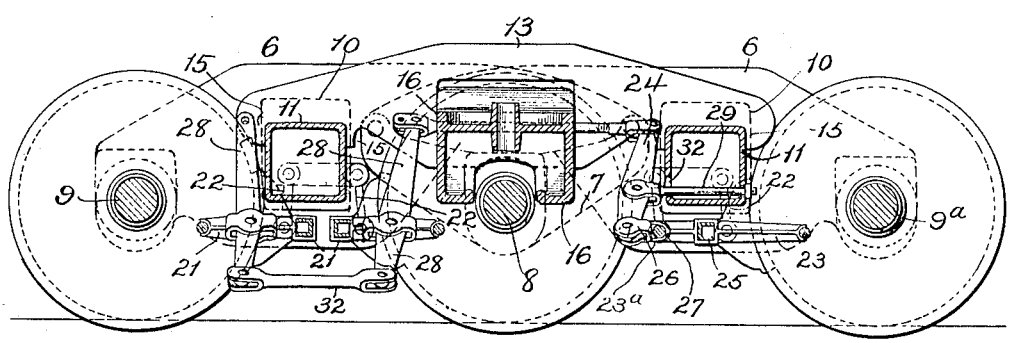

J. C. LARSEN.
BRAKE MECHANISM FOR SIX-WHEEL TRUCKS.
APPLICATION FILED APR. 1, 1918.
1,298,228.
Patented Mar. 25, 1919.
2 SHEETS—SHEET 2.
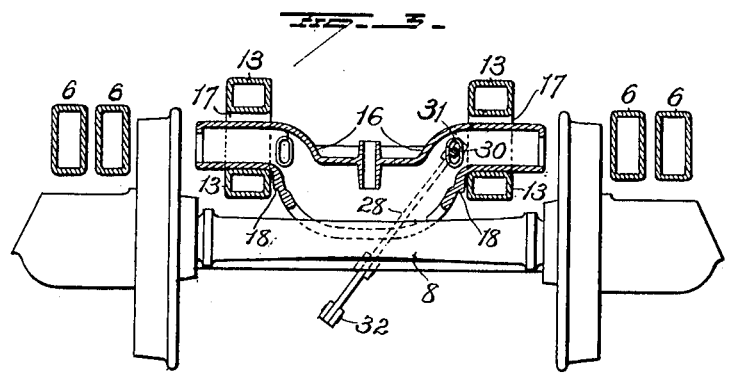
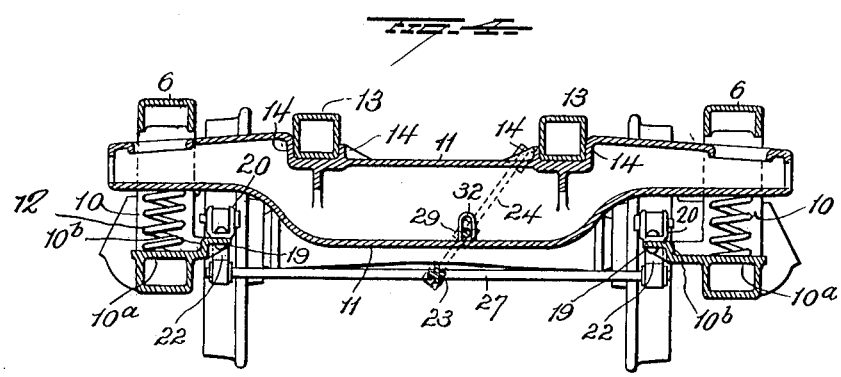
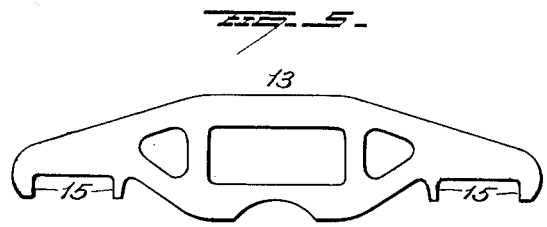
WITNESSES
E. N. Nottingham
G. F. Downing
INVENTOR
J. C. Larsen
By Seymour & Bright
Attorneys

UNITED STATES PATENT OFFICE.

JACOB C. LARSEN, OF COLUMBUS, OHIO, ASSIGNOR TO THE BUCKEYE STEEL CASTINGS COMPANY, OF COLUMBUS, OHIO.

BRAKE MECHANISM FOR SIX-WHEEL TRUCKS.

1,298,228.　　　　Specification of Letters Patent.　　Patented Mar. 25, 1919.

Application filed April 1, 1918. Serial No. 226,032.

*To all whom it may concern:*

Be it known that I, JACOB C. LARSEN, a subject of the King of Denmark, and a resident of Columbus, in the county of Franklin and State of Ohio, have invented certain new and useful Improvements in Brake Mechanism for Six-Wheel Trucks; and I do hereby declare the following to be a full, clear, and exact description of the invention, such as will enable others skilled in the art to which it appertains to make and use the same.

This invention relates to an improvement in brake mechanism for six wheel trucks, the object being to provide improved means for supporting the brake rigging whereby all parts of the latter will be independent of the up and down movements of the bolster due to compression of the bolster springs when the trucks are under load.

With this object in view my invention consists in the parts and combinations of parts as will be more fully explained and pointed out in the claims.

In the accompanying drawings, Figure 1 is a view in plan of a truck embodying my invention; Fig. 2 is a view in longitudinal vertical section, the brake levers being in elevation; Fig. 3 is a view in vertical transverse section through the main bolster; Fig. 4 is a view in vertical transverse section through one of the auxiliary bolsters, and Fig. 5 is a view in elevation of one of the side bolsters.

The invention is applicable for use with various types of six wheel trucks, and while I have illustrated this improvement in connection with the side frames used in truck design, patented to George T. Johnson and myself No. 1,253,842 dated January 15th, 1918, I have done so for the purpose of illustration only and not with the intention of limiting its application to such side frame or any other particular construction of side frame.

6 represents the truck side frames, there being two to each side, with their adjacent ends overlapping as shown in Fig. 1, for the connection therewith of the frames 7 carrying the bearings for the center axle 8. Each side frame 6 has a bearing for a journal of an end axle, and each is also provided with an opening 10 for the reception of one end of a transverse or auxiliary bolster 11, each bolster 11 being yieldingly supported adjacent its ends, on springs 12 (shown in dotted lines Fig. 1) seated within the openings 10. The transverse bolsters 11 are located as shown, one between the front and middle axles, and the other between the rear and middle axles, and support the longitudinal bolsters 13, each of the latter having bearing at its ends on the transverse bolsters 11, between the shoulders 14 on the latter as shown in Fig. 4, and each of said longitudinal bolsters 13 is provided with the shoulders 15, which prevent their endwise movement on the transverse bolster 11.

The main bolster 16, is in the present instance, located over the central axle 8, and is supported at its opposite ends in openings 17 in the two longitudinal bolsters 13 (see Fig. 3), and is held against endwise displacement by the shoulders 18 which bear against the inner faces of the longitudinal bolsters 13. With this construction the weight of the center bolster 16 and the load thereon, will be sufficient to retain the bolsters in position without further securing devices other than the shoulders or lugs previously referred to.

Cast integral with the side frame 6, and with the upper edge of the upwardly projecting flanges 10$^b$ at the inner edges of the spring seats 10$^a$ are the shelf brackets 19. These brackets extend inwardly horizontally in a plane slightly above the spring seats 10$^a$, and are reinforced by the flanges 10$^b$ all being cast integral as shown. These brackets 19 are located in a plane between the wheels as shown in Fig. 4, and form supports for the brake hanger brackets 20, which may also be cast integral with the shelf brackets 19, but I prefer the construction shown wherein the hanger brackets 20 are riveted to the shelf brackets 19, as this latter construction greatly simplifies the operation of casting the side frame.

The brake beams 21, located between the middle axle 8 and the end axle 9, are of the usual trussed type, suspended by brake hangers 22 pivotally secured to the opposite ends of the hanger brackets 20, the lower ends of the hangers 22 being attached to the brake heads.

A third brake beam located between the middle axle 8 and the end axle 9ª, is of similar trussed type, but the strut 23 which carries the pivot for the brake lever 24, is extended inwardly beyond the compression member 25, and is provided at its extreme inner end with a jaw 26 for the pivotal attachment thereto of the brake lever 24. This brake beam is suspended from two pairs of hangers 22, one hanger at each side being connected with the brake beam heads, and the second hanger at each side being connected to the transverse beam 27, which as shown in Fig. 2 passes at 23ª through the strut 23. The brake hangers 22 carrying the beam 27, are of the same length as those which suspend the brake beam, hence by properly locating the suspension point 23ª, with relation to the pivots connecting the hangers and brake heads, a parallel movement in a horizontal plane will be imparted to the brake beam.

The brake beams 21 are actuated by the levers 28, disposed diagonally as shown in Fig. 1, so that their upper ends are at one side of the center line of the truck, and all connections between the levers and the rod from the brake actuating mechanism, are at one side and in a plane above the bolsters 11, and readily accessible and clear of all parts of the truck.

The lever 24, which is between the middle axle 8 and the rear axle 9ª, is fulcrumed to the tension rod 29, and is connected at its lower end, as previously explained, to the strut 23, the said lever 24 being diagonally disposed as shown and connected at its upper end to the upper end of adjacent lever 28 by the tension rod 30, the latter passing through an elongated slot 31 in the main bolster 16. The tension rod 29 is loosely mounted in the transverse bolster 11 so as to be free to swing or move therein, the said bolster being slotted as at 32, so as to permit of movement of the bolster without effecting any change in the position of the end of said tension rod which as explained carries the lever 24.

The levers 28 are pivotally connected intermediate their ends to their respective brake beams, and are connected at their lower ends by the compression member 32, the upper end of the lever between axle 9 and adjacent transverse bolster 11 being free for the attachment thereto of the brake mechanism of the car.

With this construction, it will be seen that when a pulling stress is exerted at the upper end of the forward lever 28, the brake shoes of all three brake beams will be forced into contact with their respective wheels, and as the entire equipment is flexible and not supported by any of the parts carried by the springs, the brake pressure, will, by proportioning the levers, be the same on all the wheels.

It is evident that many slight changes might be resorted to in the relative arrangement of parts shown and described without departing from the spirit and scope of my invention. Hence I would have it understood that I do not wish to confine myself to the exact construction and arrangement of parts shown and described, but, Having fully described my invention what I claim as new and desire to secure by Letters Patent, is:—

1. In a six wheel truck, the combination of a side frame having a seat for bolster springs, an upwardly projecting flange at the inner edge of said seat, brake hanger support originating at the upper edge of the spring seat flange and extending horizontally inwardly toward the center of the truck, and a brake hanger bracket attached to said support.

2. In a car truck, the combination of a truck side frame, a pair of parallel hangers carried by each side frame, a brake beam supported at each end by a pair of hangers, whereby the beam has a parallel movement in a horizontal position, a brake actuating lever connected with said beam and a swinging fulcrum for said lever.

3. In a car truck, the combination of truck side frames, a transverse bolster, a pair of hangers carried by each side frame, a brake beam supported at each end by a pair of hangers, a brake actuating lever, and a swinging fulcrum for said lever, the said fulcrum being carried by the bolster.

4. In a six wheel truck brake, the combination of three brake beams, an actuating lever for each beam, two of said beams being pivoted to their respective levers intermediate the ends of the latter, the third beam being pivoted to the lower end of its lever, a compression member connecting the lower ends of the two first-mentioned levers, a tension member connecting the upper end of the third lever with the upper end of one of the two first mentioned levers, and a swinging fulcrum for the third lever.

5. In a six wheel truck brake, the combination of two brake beams, an actuating lever for each, each lever being pivoted to its beam intermediate its ends, a third beam supported at each end by a pair of hangers, an actuating lever for the said third beam, a swinging fulcrum for said last mentioned lever intermediate the ends of the latter, a connection between said third beam and the lower end of its actuating lever, a compression member connecting the lower ends of the two first levers, and a tension member connecting the upper end of the third lever with the upper end of one of the two first named levers.

In testimony whereof, I have signed this specification in the presence of two subscribing witnesses.

JACOB C. LARSEN.

Witnesses:
RALPH I. LOEWER,
STANLEY J. PHENEGER.